(12) United States Patent
Xing et al.

(10) Patent No.: US 12,159,235 B2
(45) Date of Patent: Dec. 3, 2024

(54) METHOD AND APPARATUS FOR VERIFYING ACCURACY OF JUDGMENT RESULT, ELECTRONIC DEVICE AND MEDIUM

(71) Applicant: BEIJING BAIDU NETCOM SCIENCE AND TECHNOLOGY CO., LTD., Beijing (CN)

(72) Inventors: Zhihui Xing, Beijing (CN); Jun Chen, Beijing (CN); Chao Lu, Beijing (CN); Haifeng Huang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 918 days.

(21) Appl. No.: 17/208,485

(22) Filed: Mar. 22, 2021

(65) Prior Publication Data
US 2021/0209482 A1    Jul. 8, 2021

(30) Foreign Application Priority Data
Sep. 24, 2020   (CN) .......................... 202011016753.3

(51) Int. Cl.
G06N 5/02      (2023.01)
G06F 16/901    (2019.01)

(52) U.S. Cl.
CPC .......... *G06N 5/02* (2013.01); *G06F 16/9024* (2019.01)

(58) Field of Classification Search
CPC .......... G06N 5/02; G06N 3/044; G06N 3/045; G06N 5/022; G06N 3/049; G06N 3/08;
(Continued)

(56) References Cited

U.S. PATENT DOCUMENTS 9,077,538  B1    7/2015  Cooley et al.

FOREIGN PATENT DOCUMENTS

| CN | 110634088 A | 12/2019 |
|----|-------------|---------|
| CN | 110797101 A | 2/2020  |

(Continued)

OTHER PUBLICATIONS

Hu et al., "Automatic Matching Method of Ocean Observation Elements Based on Edge Computing," Journal of Ocean Technology, vol. 37, No. 4, Aug. 2018, 8 pages.

(Continued)

*Primary Examiner* — Pei Yong Weng
(74) *Attorney, Agent, or Firm* — Seed IP Law Group LLP

(57) ABSTRACT

A method and apparatus for verifying accuracy of a judgment result, an electronic device and a computer readable storage medium are provided. The method may include: acquiring user description information and a judgment result corresponding to the user description information; extracting at least one descriptive element from the user description information; determining a matching degree between each of the at least one descriptive element and the judgment result using a preset verification model to obtain each actual matching value respectively; the verification model being obtained by training based on a term frequency-inverse document frequency relationship between the descriptive element and the judgment result; and determining the descriptive element having the actual matching value exceeding a preset matching value as a first element, and determining accuracy of the judgment result based on the number of the first element.

15 Claims, 6 Drawing Sheets

(58) Field of Classification Search
CPC .. G06F 16/9024; G06F 16/901; G06F 40/226; G06F 16/367; G06F 40/216; G06F 40/30
See application file for complete search history.

(56) References Cited

FOREIGN PATENT DOCUMENTS

| | | |
|---|---|---|
| CN | 110825879 A | 2/2020 |
| CN | 111259112 A | 6/2020 |
| CN | 111552880 A | 8/2020 |
| JP | 2013-228780 A | 11/2013 |

OTHER PUBLICATIONS

Impedovo et al., "Automatic Signature Verification: The State of the Art," IEEE Transactions on Systems, Man, and Cybernetics, vol. 38, No. 5, Sep. 2008, 27 pages.

Song, "Address matching algorithm based on chinese natural language understanding," Journal of Remote Sensing, 2013, 14 pages.

METHOD AND APPARATUS FOR VERIFYING ACCURACY OF JUDGMENT RESULT, ELECTRONIC DEVICE AND MEDIUM

CROSS-REFERENCE TO RELATED APPLICATIONS

This application claims priority to Chinese Application No. 202011016753.3, filed on Sep. 24, 2020 and entitled "Method and Apparatus for Verifying Accuracy of Judgment Result, Electronic Device and Medium," the content of which is hereby incorporated by reference in its entirety.

TECHNICAL FIELD

Embodiments of the present disclosure relate to the field of data processing technology, specifically to the field of artificial intelligence such as knowledge graphs and natural language processing, and more specifically to a method and apparatus for verifying accuracy of a judgment result, an electronic device, and a computer readable storage medium.

BACKGROUND

With the continuous improvement of electronic informatization and the continuous development of big data technology, there are many schemes for preliminary collation, analysis and preliminary conclusion of user description information, such as whether the user description information belonging to a certain type of data, whether the user description information being valid data, whether the user description information matching with certain preset information, to improve the processing efficiency using the information obtained through automatic analysis.

SUMMARY

Embodiments of the present disclosure propose a method and apparatus for verifying accuracy of a judgment result, an electronic device, and a computer readable storage medium.

In a first aspect, an embodiment of the present disclosure provides a method for verifying accuracy of a judgment result, the method including: acquiring user description information and a judgment result corresponding to the user description information; extracting at least one descriptive element from the user description information; determining a matching degree between each of the at least one descriptive element and the judgment result using a preset verification model to obtain each actual matching value respectively; the verification model being obtained by training based on a term frequency-inverse document frequency TF-IDF relationship between the descriptive element and the judgment result; and determining the descriptive element having the actual matching value exceeding a preset matching value as a first element, and determining accuracy of the judgment result based on a number of the first element.

In a second aspect, an embodiment of the present disclosure provides an apparatus for verifying accuracy of a judgment result, the apparatus including: a user description information and judgment result acquisition unit, configured to acquire user description information and a judgment result corresponding to the user description information; a descriptive element extraction unit, configured to extract at least one descriptive element from the user description information; a matching degree verification unit, configured to determine a matching degree between each of the at least one descriptive element and the judgment result using a preset verification model to obtain each actual matching value respectively; the verification model being obtained by training based on a term frequency-inverse document frequency TF-IDF relationship between the descriptive element and the judgment result; and a first element and judgment accuracy determination unit, configured to determine the descriptive element having the actual matching value exceeding a preset matching value as a first element, and determine accuracy of the judgment result based on a number of the first element.

In a third aspect, an embodiment of the present disclosure provides an electronic device, the device electronic including: at least one processor; and a memory communicatively connected with the at least one processor, the memory storing instructions executable by the at least one processor, and the instructions, when executed by the at least one processor, causing the at least one processor to implement the method for verifying accuracy of a judgment result according to any embodiment of the first aspect.

In a fourth aspect, an embodiment of the present disclosure provides a non-transitory computer readable storage medium storing computer instructions, the computer instructions being used to cause a computer to implement the method for verifying accuracy of a judgment result according to any embodiment of the first aspect.

It should be understood that the content described in this section is not intended to identify key or important features of embodiments of the present disclosure, nor is it intended to limit the scope of embodiments of the present disclosure. Other features of embodiments of the present disclosure will be easily understood by the following description.

BRIEF DESCRIPTION OF THE DRAWINGS

By reading the detailed description of non-limiting embodiments with reference to the following accompanying drawings, other features, objectives and advantages of embodiments of the present disclosure will become more apparent.

DETAILED DESCRIPTION OF EMBODIMENTS

The present disclosure will be further described below in detail in combination with the accompanying drawings and embodiments. It should be appreciated that embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

According to the method and apparatus for verifying accuracy of a judgment result, the electronic device, and the computer readable storage medium provided by embodiments of the present disclosure, user description information and a judgment result corresponding to the user description information are acquired first; then at least one descriptive element is extracted from the user description information; a matching degree between each of the at least one descriptive element and the judgment result is determined to obtain each actual matching value respectively using a preset verification model obtained by training based on a term frequency-inverse document frequency TF-IDF between the descriptive element and the judgment result; and finally the descriptive element having the actual matching value exceeding a preset matching value is determined as a first element, and the accuracy of the judgment result is determined based on a number of the first element.

In order to determine whether the judgment result is accurate in the judgment of the user description information, embodiments of the present disclosure use the pre-trained verification model representing the TF-IDF relationship between the descriptive element and the judgment result to verify whether the actual descriptive element extracted from the user description information matches the actual judgment result, to obtain the matching degree between each descriptive element and the judgment result, and finally reflect the accuracy of the judgment result by the number of matched descriptive element, thereby improving the credibility of the judgment result.

Figure 1:
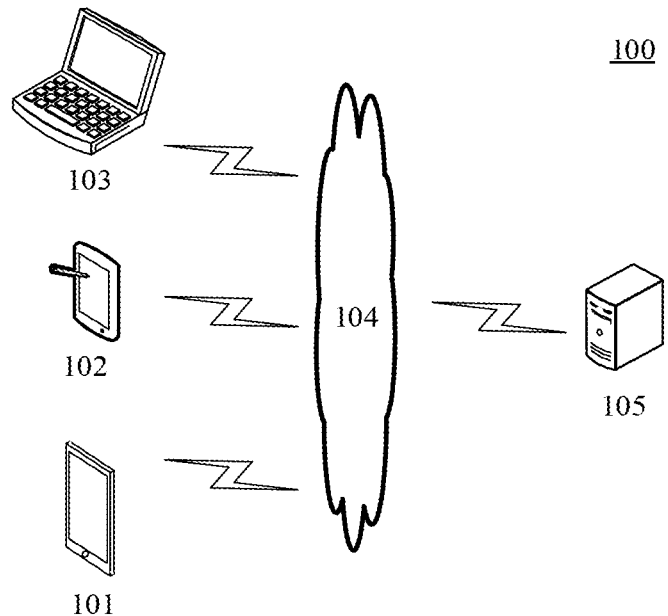
FIG. 1 is an example system architecture in which embodiments of the present disclosure may be implemented.

FIG. 1 shows an example system architecture 100 in which a method and apparatus for verifying accuracy of a judgment result, an electronic device, and a computer readable storage medium of embodiments of the present disclosure may be implemented.

As shown in FIG. 1, the system architecture 100 may include terminal devices 101, 102, 103, a network 104, and a server 105. The network 104 serves as a medium providing a communication link between the terminal devices 101, 102, 103 and the server 105. The network 104 may include various types of connections, such as wired or wireless communication links, or optical fiber cables.

A user may interact with the server 105 through the network 104 using the terminal devices 101, 102, 103, to receive or send messages or the like. The terminal devices 101, 102, 103 and the server 105 may be installed with various applications for implementing information communication between the terminal devices 101, 102, 103 and the server 105, such as information sending and receiving applications, description information analysis applications, judgment result analysis applications, etc.

The terminal devices 101, 102, and 103 and the server 105 may be hardware or software. When the terminal devices 101, 102, and 103 are hardware, the terminal devices 101, 102, and 103 may be various electronic devices having display screens, including but not limited to smart phones, tablet computers, laptop portable computers, desktop computers, or the like. When the terminal devices 101, 102, and 103 are software, the terminal devices 101, 102, and 103 may be installed in the electronic devices listed above, or may be implemented as a plurality of pieces of software or software modules, or as a single piece of software or software module, which is not particularly limited herein. When the server 105 is hardware, the server 105 may be implemented as a distributed server cluster composed of a plurality of servers, or may be implemented as a single server. When the server is software, the server 105 may be implemented as a plurality of pieces of software or software modules, or as a single piece of software or software module, which is not particularly limited herein.

The server 105 may provide various services using various built-in applications. Taking a judgment result analysis application that may provide a service that verifies whether a judgment result corresponding to user description information is accurate as an example, when the server 105 runs the judgment result analysis application, the following effects may be realized: first, user description information inputted by a user using the terminal devices 101, 102, 103 that the user uses through the network 104, and a judgment result given by the terminal devices 101, 102, 103 on the inputted user description information are received; then, at least one descriptive element is extracted from the user description information; a matching degree between each of the at least one descriptive element and the judgment result is determined to obtain each actual matching value respectively using a preset verification model obtained by training based on a term frequency-inverse document frequency TF-IDF relationship between the descriptive element and the judgment result; and finally the descriptive element having the actual matching value exceeding a preset matching value is determined as a first element, and accuracy of the judgment result is determined based on the number of the first element. Further, the server 105 may also output a parameter representing the accuracy of the judgment result according to a preset path. The preset path includes, but is not limited to, a path returning to the terminal devices 101, 102, 103, and a storage path of another data server.

It should be noted that the user description information and the judgment result may be acquired in real time from the terminal devices 101, 102, 103 through the network 104, and may also be stored locally in the server 105 in various methods. Therefore, when the server 105 detects that the data has been stored locally (for example, a to-be-processed accuracy calculation task saved before processing), the server 105 may choose to directly acquire the data locally. In this case, the example system architecture 100 may also not include the terminal devices 101, 102, 103 and the network 104.

Since the calculation of the accuracy involves a large number of operations and requires to occupy more operation resources and strong computing power, the method for verifying accuracy of a judgment result provided in the subsequent embodiments of the present disclosure is generally performed by the server 105 having strong computing power and more operation resources. Accordingly, the apparatus for verifying accuracy of a judgment result is generally also provided in the server 105. However, it should also be noted that when the terminal devices 101, 102, and 103 also have the required computing power and operation resources, the terminal devices 101, 102, and 103 may also use the judgment result analysis application installed thereon to complete the above various operations performed by the server 105, then output the same result as the server 105. In particular, when there are a plurality of terminal devices having different computing capabilities at the same time, and the terminal device on which the judgment result analysis application is installed has stronger computing power and more operation resources, then the terminal device may be used to perform the operations, thereby appropriately reducing operation pressure of the server 105. Accordingly, the apparatus for verifying accuracy of a judgment result may also be provided in the terminal devices 101, 102, 103. In this case, the example system architecture 100 may not include the server 105 and the network 104.

It should be understood that the numbers of terminal devices, networks, and servers in FIG. 1 are merely illustrative. Depending on the implementation needs, there may be any number of terminal devices, networks, and servers.

Figure 2:
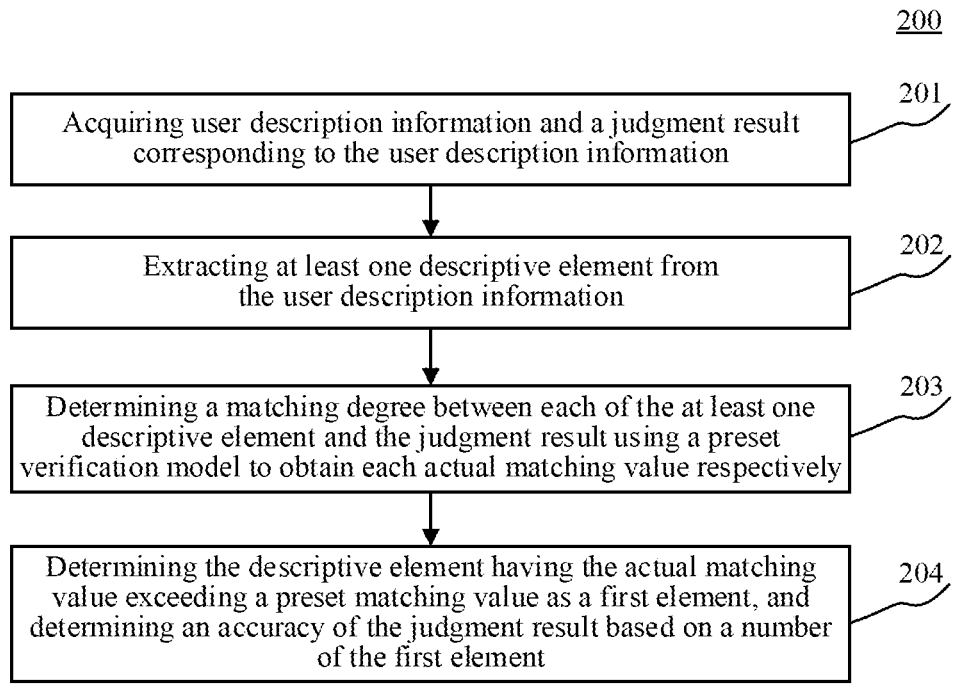
FIG. 2 is a flowchart of a method for verifying accuracy of a judgment result according to an embodiment of the present disclosure.

With further reference to FIG. 2, FIG. 2 is a flowchart of a method for verifying accuracy of a judgment result according to an embodiment of the present disclosure. A flow 200 includes the following steps.

Step 201: acquiring user description information and a judgment result corresponding to the user description information.

This step aims to acquire the user description information and the judgment result corresponding to the user description information (for example, sent by the terminal devices 101, 102, 103 shown in FIG. 1 through the network 104) by an executing body (for example, the server 105 shown in FIG. 1) of the method for verifying accuracy of a judgment result.

The user description information refers to information obtained after a user describes a certain aspect of himself or what he has learned, such as a self-written meeting log, edited webpage content, article content, a description of recent physical health status of the user; the judgment result corresponding to the user description information refers to an analysis result outputted by some functional module that may implement a judgment function (such as SDK provided by a third party, that is, a third-party application toolkit) given based on the content in the user description information. For example, when the user description information is a self-written meeting log, the functional module may obtain a judgment result of whether the meeting log is written in a preset format. For example, when the user description information is self-written content of a webpage article, the functional module may obtain a judgment result of whether the content of the webpage article contains a sensitive word that is prohibited by default. For example, when the user description information is medical record information describing recent physical health status of the user, the functional module may obtain a suspected disease that the user may suffer from, etc.

How the functional module gives the judgment result for the content of the user description information is not the focus of embodiments of the present disclosure. This step only describes a situation where the user description information and the judgment result corresponding to the user description information may be acquired. That is, how to verify the accuracy of the judgment result given by the functional module through subsequent steps in this situation, so that the user or others can more clearly know how the judgment result is obtained, for supporting the user's recognition of the judgment result, at the same time filtering inaccurate judgment result, guiding and improving the accuracy of the judgment result obtained by the functional module.

Step 202: extracting at least one descriptive element from the user description information.

On the basis of step 201, this step aims to extract the at least one descriptive element from the user description information by the executing body. Further, the at least one descriptive element may also be represented as a descriptive element set, which can better be used as a whole for the subsequent steps.

Here, the operation of extracting the descriptive element from the user description information is feature extraction or key information extraction operation, which may extract a key descriptive element from the user description information including both non-descriptive element and descriptive element using a method such as word segmentation, key word extraction, and synonym processing, to avoid interference caused by non-descriptive element participating in the subsequent steps.

In step 201, it has been clarified that the user description information may be represented as different types of information according to different actual situations. For different types of user description information, the extraction of the descriptive element should not only be combined with the type, but also with an entry point at which the functional module obtains the judgment result, thereby extracting the descriptive element that matches the judgment result obtained by the functional module more closely. Only in this case, subsequent operations of verifying whether the descriptive element matches the judgment result, determining a matching degree, and determining whether the judgment result is accurate based on the matching degree is meaningful and effective. Specifically, when the user description information is a meeting log, and the judgment result is whether the format is a preset format, the extracted descriptive element should focus on some element representing the writing format in the meeting log, such as string of the first/last paragraph, whether the second paragraph is blank; when the user description information is content of a webpage article and the judgment result is whether the content contains a sensitive word, the extracted descriptive element should focus on a relevant keyword about sensitive content; and when the user description information is an electronic medical record and the judgment result is a suspected disease, the extracted descriptive element should focus on a medical entity, a disease element, etc., related to disease symptoms.

Step 203: determining a matching degree between each of the at least one descriptive element and the judgment result using a preset verification model to obtain each actual matching value respectively.

The verification model is obtained by training based on a TF-IDF (term frequency-inverse document frequency) relationship between the descriptive element and the judgment result.

TF-IDF is a statistical method used to evaluate the importance of a term to a document set or a document in a corpus. The importance of a term increases in proportion to the number of times it appears in the document, but at the same time the importance decreases in inverse proportion to the frequency of its appearance in the corpus. Therefore, the more a term appears in an article, and the less the term appears in all the documents, the more the term can represent the article. Based on this characteristic, embodiments of the present disclosure actually use the TF-IDF statistical method to help the machine as much as possible to understand a relevance between a certain term and the user description including the term from the semantic level.

It should be noted that the reason why the verification model trained based on the TF-IDF relationship is used to determine the matching degree between the descriptive element and the judgment result is that, generally the method for obtaining the judgment result depends on the method supporting to obtain the judgment result which determines whether the descriptive element hits a supporting element constituting the judgment result, and the hitting method is carried out through "hard" match, that is, whether there are exactly the same characters. However, different users often describe the same content differently. Therefore, it is easy to have the problem of the descriptive element not being able to hit all elements, so that the reason for supporting to obtain the judgment result is insufficient and the credibility is not high. Therefore, in order to obtain a comprehensive and correct supporting basis as much as possible, it is also necessary to use other methods to make the descriptive element hit as much as possible. This step is to use the TF-IDF relationship to solve this problem from the semantic level, while discovering new supporting element. Therefore, the number of hit elements and the credibility may also be improved by increasing the total number of supporting elements (which may be obtained through knowledge related to the judgment result recorded in a knowledge graph).

On the basis of step 202, this step aims to use the verification model that represents an association relationship between the descriptive element and the judgment result at the semantic level by the executing body to determine the matching degree between each descriptive element and the judgment result, and obtain the actual matching value that can be quantitatively described.

Step 204: determining the descriptive element having the actual matching value exceeding a preset matching value as a first element, and determining accuracy of the judgment result based on a number of the first element.

On the basis of step 203, this step aims to determine the descriptive element having the actual matching value exceeding the preset matching value as the first element, and determine the accuracy of the judgment result based on the number of the first element by the executing body. That is, the greater the number of the first element, the more evidence that may be used to support the judgment result, so as to draw a verification conclusion that the judgment result is more accurate. Specifically, a parameter representing the accuracy of the judgment result may be only the number of the first element, or a ratio of the number of the first element to a total number of all the supporting elements, or other operation method that may make the obtained accuracy higher as the number of the first element increases, which is not particularly limited herein.

Further, the determined accuracy may be expressed in a variety of methods, for example, the accuracy may be simply classified into three levels: low, medium, and high, or may be converted to a specific value in the percentile system, etc. In particular, which method to use may also be determined in combination with the subsequent method in which targeted processing is performed for the levels of the accuracy. For example, there are only two subsequent implementation measures, which correspond to operations to be performed when corresponding to accuracy and inaccuracy.

Then, the accuracy determined in this step may be classified into only two levels. For example, the accuracy with more than score of 80 in the percentile system is classified as accurate, and the other accuracy is classified as inaccurate.

In order to determine whether the judgment result is accurate in the judgment of the user description information, the method for verifying accuracy of a judgment result provided by embodiments of the present disclosure uses the pre-trained verification model representing the TF-IDF relationship between the descriptive element and the judgment result to verify whether the actual descriptive element extracted from the user description information matches the actual judgment result, to obtain the matching degree between each descriptive element and the judgment result, and finally reflect the accuracy of the judgment result by the number of matched descriptive element, thereby improving the credibility of the judgment result.

Figure 3:
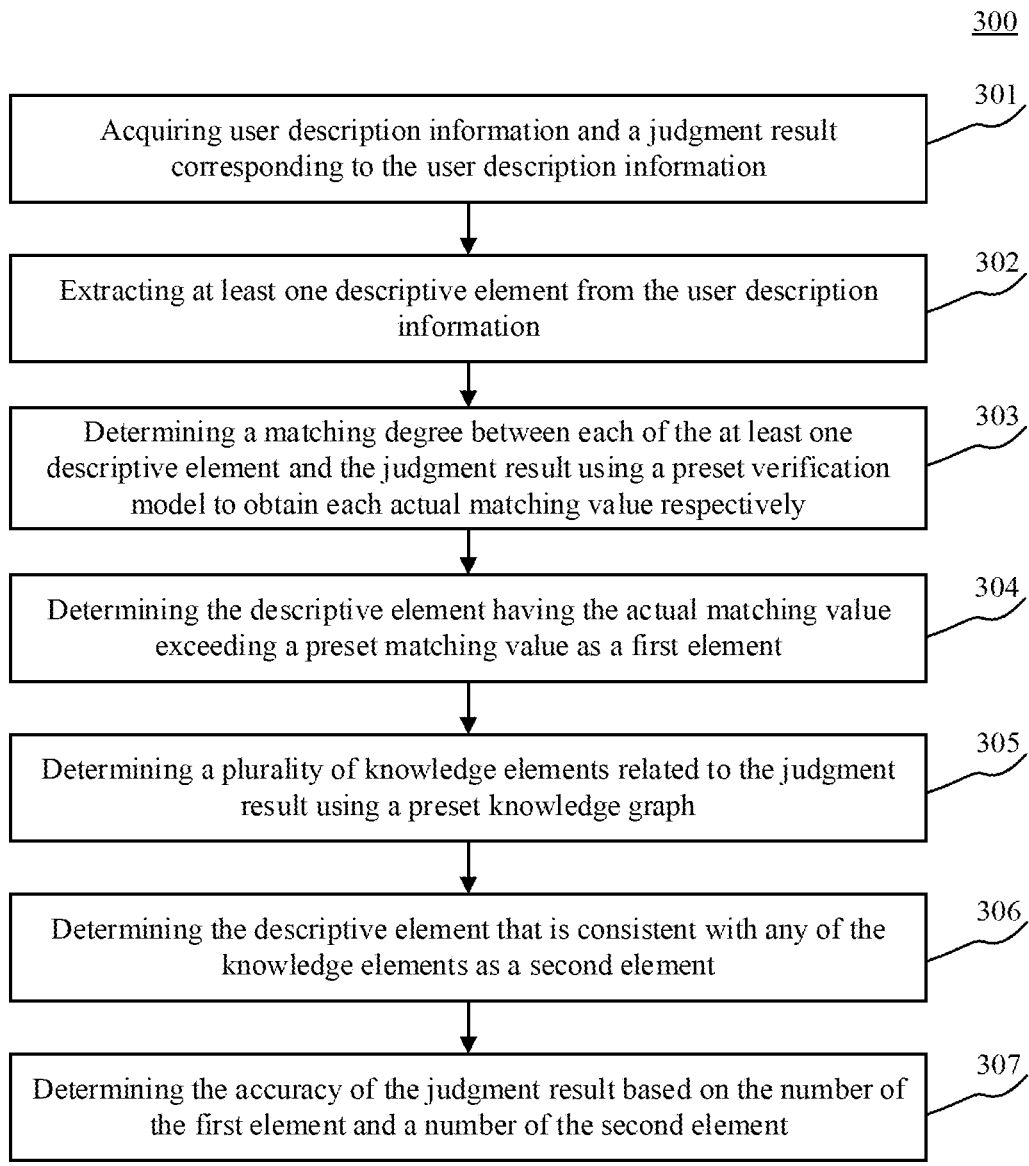
FIG. 3 is a flowchart of another method for verifying accuracy of a judgment result according to an embodiment of the present disclosure.

With further reference to FIG. 3, FIG. 3 is a flowchart of another method for verifying accuracy of a judgment result according to an embodiment of the present disclosure. A flow 300 includes the following steps.

Step 301: acquiring user description information and a judgment result corresponding to the user description information.

Step 302: extracting at least one descriptive element from the user description information.

Step 303: determining a matching degree between each of the at least one descriptive element and the judgment result using a preset verification model to obtain each actual matching value respectively.

Step 304: determining the descriptive element having the actual matching value exceeding a preset matching value as a first element.

The above steps 301 to 304 are the same as steps 201-203 and the previous part of step 204 shown in FIG. 2. For the contents of the same parts, reference may be made to the corresponding parts of the previous embodiment, and detailed description thereof will be omitted.

Step 305: determining a plurality of knowledge elements related to the judgment result using a preset knowledge graph.

Step 306: determining the descriptive element that is consistent with any of the knowledge elements as a second element.

Different from the method for determining the first element from the semantic level based on the TF-IDF relationship provided in step 304, step 305 is to determine a plurality of knowledge elements related to the judgment result using the preset knowledge graph, and then through step 306, the descriptive element that is consistent with any of the knowledge elements is determined as the second element, that is, "hard" knowledge recorded in the knowledge graph is also combined and used to determine the hit element.

In some other embodiments of the present embodiment, for how to determine the second element, a following implementation is further provided.

A confidence degree of each of the knowledge elements is acquired.

A similarity between each of the at least one descriptive element and each of the knowledge elements is calculated and obtained respectively.

The knowledge element and the descriptive element that are consistent are determined based on the similarity and the confidence degree, and the descriptive element that is consistent with any of the knowledge elements is determined as the second element.

Determination of the knowledge element and the descriptive element that are consistent based on the similarity and the confidence degree may be expressed as the formula: Score=sim(finding, spo_item)*confi(spo_item), where sim represents similarity calculation, finding represents the extracted descriptive element, spo_item represents a relationship pair between element and judgment result, and confi represents the confidence degree.

Similarity measures a similarity degree between a descriptive element and a knowledge element, which is used to replace the conventional hard matching method and is calculated by combining the model with rule determination: rule determination: subordinate relationship, parent-child string; unsupervised learning: performing offline pre-training on a large amount of relevant historical data, acquiring a pre-training vector, and calculating a similarity based on a term vector and a word vector. Similarity model: training data: mining an element subordinate relationship in a big graph of a knowledge graph, elements with the subordinate relationship having higher similarity being used as basic training data, and mining more similarity pairs through model iteration; and model structure: LSTM (long short-term memory)+attention. This model structure may fully extract similar and identical terms and words between the elements, reflect the similarity between the elements, at the same time increase mask and random disturbance, and increase model robustness and migration capabilities.

The confidence degree of a knowledge element indicates the credibility of each knowledge element. The reason for existence of this parameter is that there may be errors in the data when constructing the knowledge graph, that is, there is accuracy problem when mining elements for the knowledge graph. Therefore, the confidence degrees of different knowledge elements may be given by evaluating the sources of the knowledge elements. For example, for information from professional books, textbooks, and published by authoritative certification bodies, the confidence degree of the extracted knowledge element is marked as 1, others may be appropriately lowered based on this standard, and the above two aspects may be combined to improve the accuracy of consistency determination.

Step 307: determining the accuracy of the judgment result based on the number of the first element and a number of the second element.

Different from the embodiment shown in the flow 200, the present embodiment adds the solution of determining the second element from another angle using the knowledge graph provided in step 305 to step 306, therefore, when judging the accuracy, it is also adaptively adjusted to determine the accuracy of the judgment result based on the number of the first element and the number of the second element.

Specifically, considering that there may be duplicates in the first element and the second element, the first element and the second element may be deduplicated to obtain an element set, and then a ratio of the number of elements in the element set to a total number of the knowledge elements may be used as the accuracy of the judgment result, in order to make use of the characteristic that only one item of the same element exists in the set, and obtain accuracy conclusion as accurate as possible.

Different from the previous embodiment as shown in the flow 200, the present embodiment provides another solution of trying to hit elements that are related to the judgment result and that may be used to support that the judgment result is accurate based on the knowledge graph through step 305 to step 306. The solution is combined with the solution of verifying the matching degree between the descriptive element and the judgment result from the semantic level obtained by training based on the TF-IDF relationship provided in step 303 to step 304, so that the final accuracy determined based on the number of the first element and the number of the second element at the same time is more accurate.

On the basis of the embodiment of the flow 300 as shown in FIG. 3, in response to a first element being different from any of the knowledge elements, which indicates that the verification model trained using the TF-IDF relationship also discovers a new knowledge element that has not been mined when constructing the knowledge graph, the first element different from any of the knowledge elements may further be added as a supplementary element to the knowledge graph, to improve the comprehensiveness of the knowledge elements related to the judgment result recorded in the knowledge graph.

Furthermore, since the first element obtained from the verification model and the second element obtained from the knowledge graph are combined at the same time, and the numbers calculated and obtained using the two methods may have different effects on the final determined accuracy, an idea of weighting may also be combined to improve the accuracy.

An implementation includes but not limited to following steps.

A first number weight and a second number weight set respectively for the first element and the second element in advance are acquired.

The number of the first element and the first number weight, the number of the second element and the second number weight are calculated according to a weighted calculation method to obtain a weighted element number.

The accuracy of the judgment result is determined based on the weighted element number.

Figure 4:
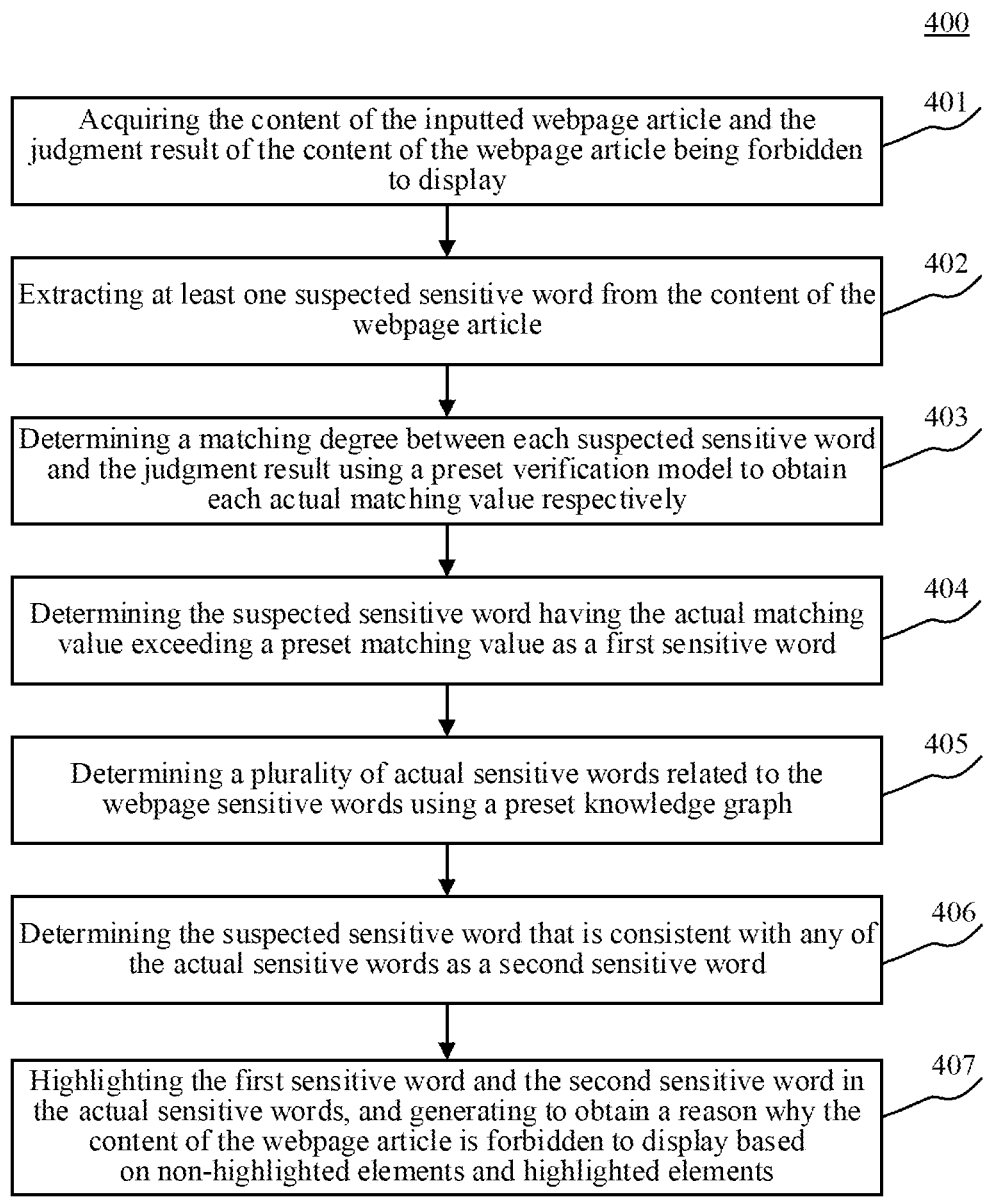
FIG. 4 is a schematic flowchart of a method for verifying accuracy of a judgment result of verifying whether being a malicious webpage in a malicious webpage identification scenario according to an embodiment of the present disclosure.

In order to deepen understanding, embodiments of the present disclosure further combine a specific application scenario: the user description information is specifically a webpage article written by the user, and the judgment result is a result of whether the content of the webpage article is forbidden to display due to the presence of many sensitive words. For a specific implementation solution that can finally verify whether the given judgment result is accurate, reference may be made to a flow 400 as shown in FIG. 4.

Step 401: acquiring the content of the inputted webpage article and the judgment result of the content of the webpage article being forbidden to display.

Step 402: extracting at least one suspected sensitive word from the content of the webpage article.

Specifically, the extracted suspected sensitive word should include a feature that represents whether the word is a sensitive word, such as whether the word contains directly sensitive words such as "wanwan", "Wanwan", "exposure", "slut", or indirect sensitive words obtained by slightly transforming the directly sensitive words, such as "exposure_", "sl0ut".

Step 403: determining a matching degree between each suspected sensitive word and the judgment result using a preset verification model to obtain each actual matching value respectively.

Assuming that a total of 60 suspected sensitive words are extracted, the actual matching values of the 60 suspected sensitive words are calculated respectively, of which 48 actual matching values exceed the score of 85 (the full score is 100), 6 actual matching values exceed the score of 75 and do not exceed the score of 85, and 6 actual matching values do not exceed the score of 75.

Step 404: determining the suspected sensitive word having the actual matching value exceeding a preset matching value as a first sensitive word.

Assuming that the preset matching value is the score of 85, then there are 48 first sensitive words.

Step 405: determining a plurality of actual sensitive words related to the webpage sensitive words using a preset knowledge graph.

It is assumed that there are 100 actual sensitive words recorded in the knowledge graph.

Step 406: determining the suspected sensitive word that is consistent with any of the actual sensitive words as a second sensitive word.

Assuming that a total of 45 second sensitive words are determined through this step.

Step 407: highlighting the first sensitive word and the second sensitive word in the actual sensitive words, and generating to obtain a reason why the content of the webpage article is forbidden to display based on non-highlighted elements and highlighted elements.

Combining the 48 first sensitive words determined in step 404 and the 45 second sensitive words determined in step 406, after de-duplication, it is discovered that 43 second sensitive words belong to the first sensitive word, so there is a total of 50 sensitive words. Therefore, 100 actual sensitive words are selected as candidate sensitive words, and 50 sensitive words that are same as the sensitive words in the candidate sensitive words are highlighted, to highlight the sensitive words in the content of the webpage article, and present to the writer and backend manager a specific reason (more than 30 sensitive words) why the content of the webpage article is forbidden to display.

Figure 5:
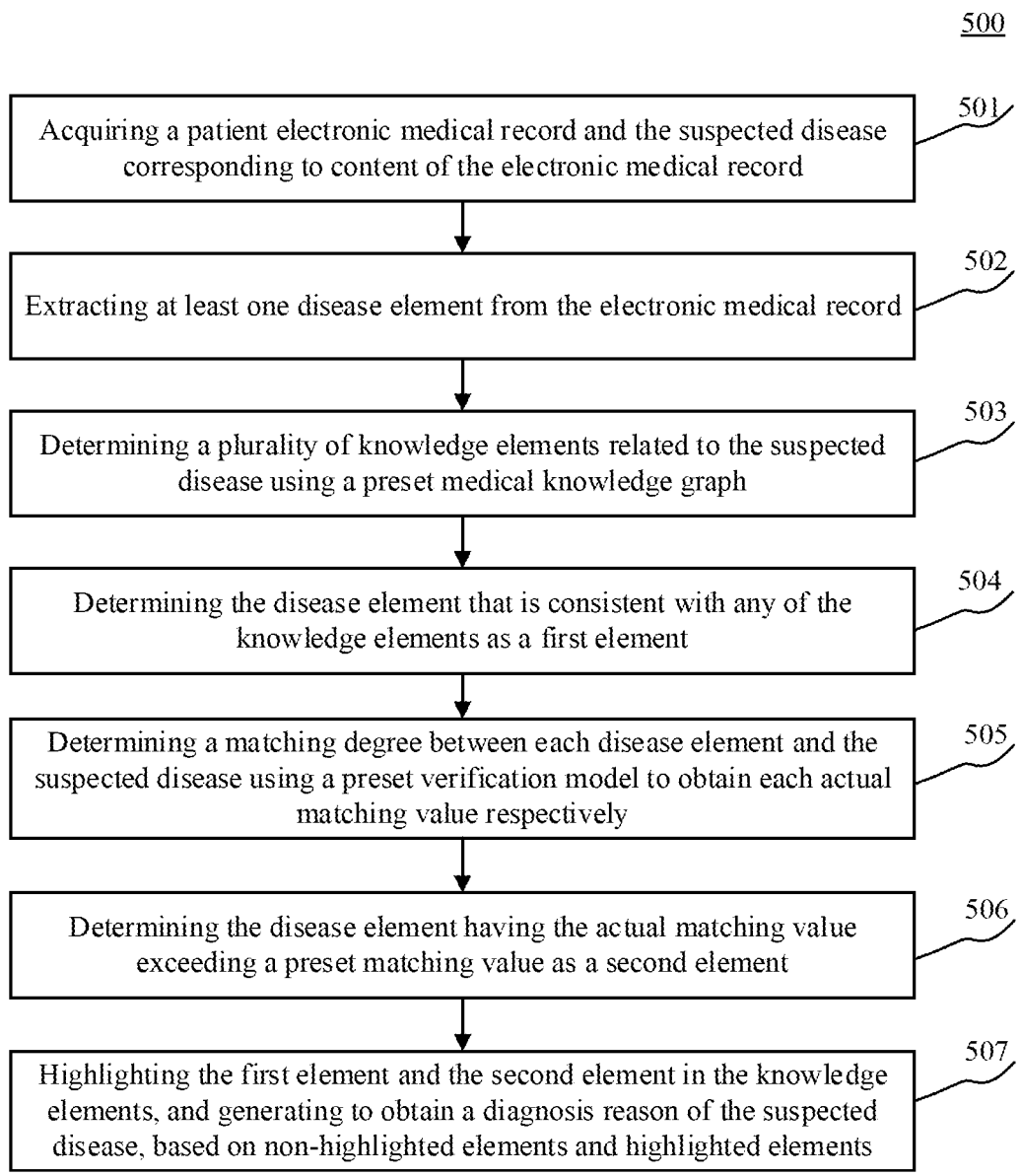
FIG. 5 is a schematic flowchart of a method for verifying accuracy of a diagnosis result of a suspected disease in a disease diagnosis scenario according to an embodiment of the present disclosure.

To further deepen the understanding, the present embodiment further combines another application scenario that is different from the flow 400: the user description information is the user's electronic medical record, and the judgment result is a suspected disease. A specific implementation is provided, referring to a flow 500 as shown in FIG. 5.

Step 501: acquiring a patient electronic medical record and the suspected disease corresponding to content of the electronic medical record.

Assuming that the content of the electronic medical record is: cough for two days, white sputum, and headache. The suspected disease is: acute upper respiratory tract infection.

The intersection of AB sets is cough and white sputum (cough is a hard match, and white sputum and expectoration are related by the above similarity model). At the same time, according to the TF-IDF relationship mined and a disease element model, it is judged that headache and upper respiratory tract infection are also related. Therefore, cough, white sputum and headache are highlighted, and remaining elements in the knowledge graph: fever, sneezing, runny nose, chills, etc. are not highlighted for display. So that highlighted and non-highlighted are distinguished, both of which are related to the disease, but those appearing in the medical record are highlighted, and those not appearing are not highlighted.

Step 502: extracting at least one disease element from the electronic medical record.

The extracted disease elements are cough, expectoration and headache.

Step 503: determining a plurality of knowledge elements related to the suspected disease using a preset medical knowledge graph.

The knowledge graph provides the elements related to upper respiratory tract infection: cough, expectoration, fever, sneezing, runny nose, chills and so on.

Step 504: determining the disease element that is consistent with any of the knowledge elements as a first element.

Based on the "hard" match between the disease elements recorded in the knowledge graph and the actually obtained disease elements, "cough" and "expectoration" may be determined as the first element.

Step 505: determining a matching degree between each disease element and the suspected disease using a preset verification model to obtain each actual matching value respectively.

In this step, using the provided verification model, it is obtained respectively: the actual matching value of "cough" is the score of 97, the actual matching value of "expectoration" is the score of 93, and the actual matching value of "headache" is the score of 86.

Step 506: determining the disease element having the actual matching value exceeding a preset matching value as a second element.

In the case of the preset matching value being the score of 85, "cough", "expectoration" and "headache" all belong to the second element.

Step 507: highlighting the first element and the second element in the knowledge elements, and generating to obtain a diagnosis reason of the suspected disease, based on non-highlighted elements and highlighted elements.

Therefore, using the first element and the second element, the disease element "headache" is also added to disease element composition of the disease "upper respiratory tract infection", and the three items of "cough", "expectoration" and "headache" in all the disease elements of the disease are highlighted. The three highlighted disease elements are used to generate the diagnosis reason for judging that the patient suffers from acute upper respiratory tract infection.

Figure 6:
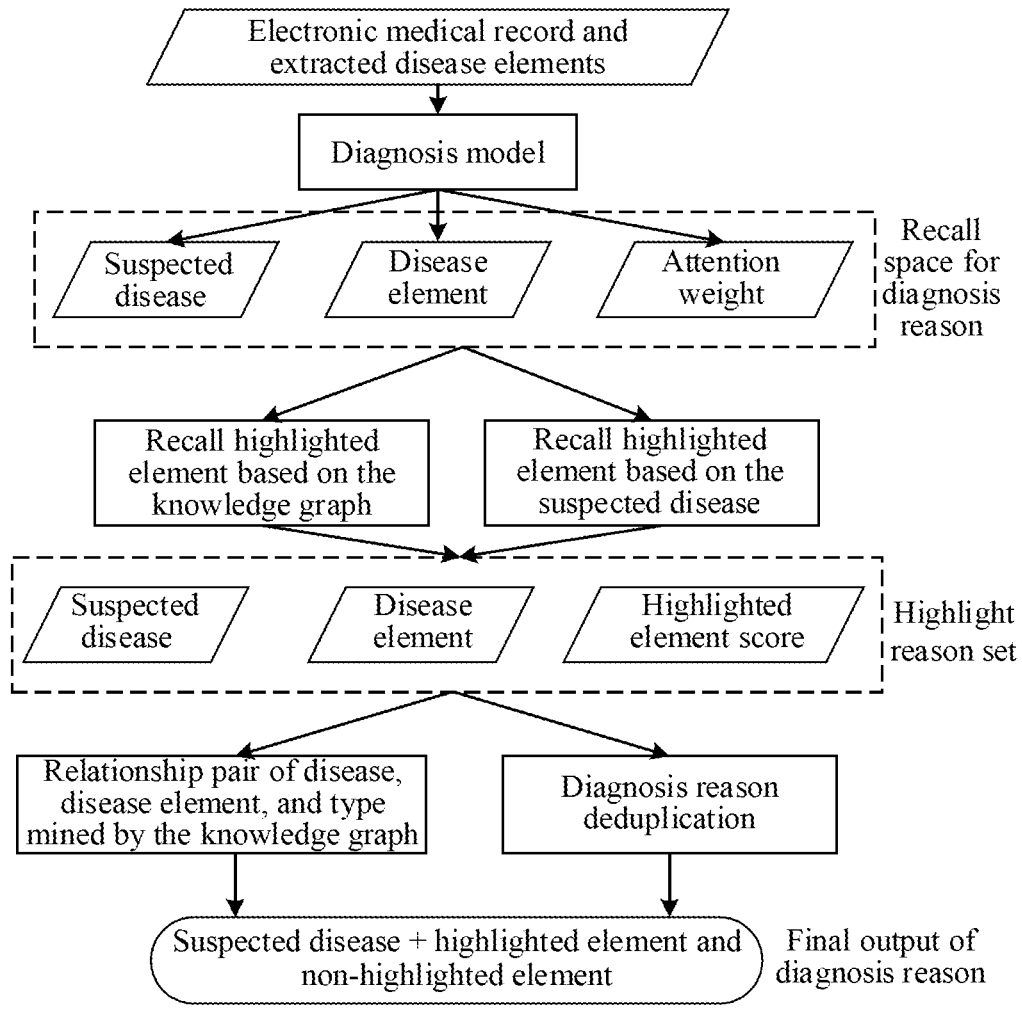
FIG. 6 is a schematic flowchart for obtaining a diagnosis reason corresponding to FIG. 5 according to an embodiment of the present disclosure.

The above process may also refer to the schematic flowchart for obtaining a diagnosis reason as shown in FIG. 6. Here, an attention weight refers to an association between each disease element and the suspected disease. The higher the weight, the higher the support of the disease element for the judgment of the suspected disease; score of a highlighted element refers to a score calculated by combining the disease element and the suspected disease based on the attention weight, if the score exceeds a certain value, then the element is highlighted for display; and a relationship pair of disease, disease element, and type is mined by the knowledge graph. The flow shown in FIG. 6 may be briefly described as: regarding each disease element and each suspected disease extracted from the electronic medical record as a relationship pair between the disease and the disease element, and recalling a reasonable relationship pair and highlighting the reasonable relationship pair for display, displaying the diagnosis reason based on a highlight result and a non-highlight result. The recalled part also includes a recall based on the knowledge graph and a recall based on semantic association of disease and disease element. The combination of the two solutions takes into account knowledge-based evidence and natural language understanding of the medical record content, thereby improving the accuracy.

Figure 7:
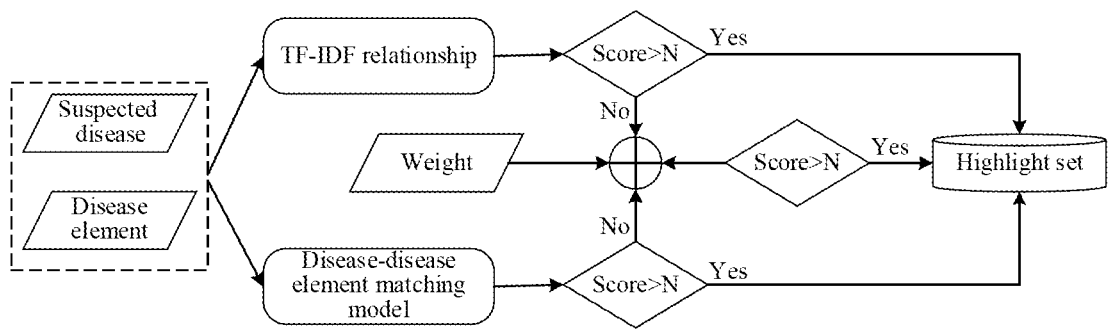
FIG. 7 is a schematic flowchart for verifying based on a TF-IDF relationship corresponding to FIG. 5 according to an embodiment of the present disclosure.

The above verification model trained based on the TF-IDF relationship between disease and disease element may be specifically represented as a schematic flowchart as shown in FIG. 7. That is, to mine the TF-IDF relationship between disease and disease element offline based on a disease condition big digraph, train a disease element matching model (that is, the verification model), and use the TF-IDF relationship pair between disease and disease element, the relationship pair between disease, disease element and type mined by the knowledge graph as an initial training set. Model combination may specifically select a text type neural network plus cosine matching computing mechanism. The flow shown in FIG. 7 may be briefly described as: when a matching score of disease and disease element calculated by the TF-IDF and the model is higher than a set threshold, the disease element is added to a highlight set, and when the score is lower than the set threshold, a weight outputted in the AI diagnosis process for additional weighting is introduced, a higher weight representing that the element is more important when giving the diagnosis of the suspected disease. After comprehensive evaluation of the above two strategies, the final score of the element is given, and it is judged whether the element is to be added to the highlight set.

Figure 8:
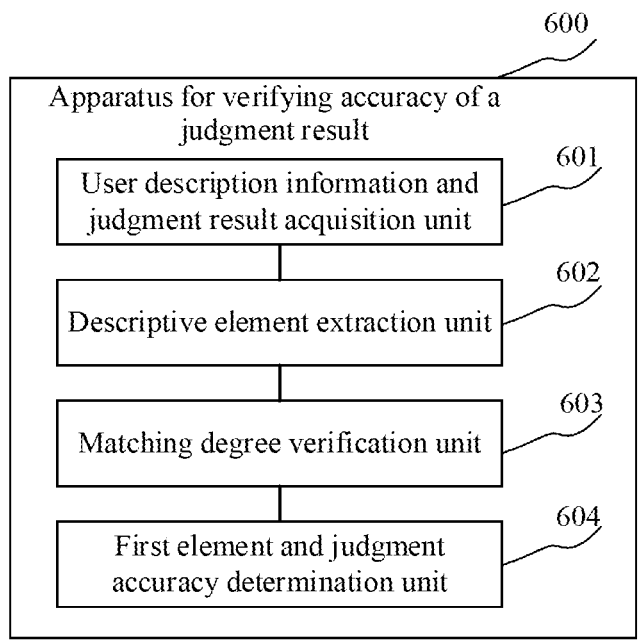
FIG. 8 is a structural block diagram of an apparatus for verifying accuracy of a judgment result according to an embodiment of the present disclosure.

With further reference to FIG. 8, as an implementation of the method shown in the above figures, an embodiment of the present disclosure provides an apparatus for verifying accuracy of a judgment result, and the apparatus embodiment corresponds to the method embodiment as shown in FIG. 2. The apparatus may be specifically applied to various electronic devices.

As shown in FIG. 8, an apparatus 600 for verifying accuracy of a judgment result of the present embodiment may include: a user description information and judgment result acquisition unit 601, a descriptive element extraction unit 602, a matching degree verification unit 603 and a first element and judgment accuracy determination unit 604. The user description information and judgment result acquisition unit 601 is configured to acquire user description information and a judgment result corresponding to the user description information. The descriptive element extraction unit 602 is configured to extract at least one descriptive element from the user description information. The matching degree verification unit 603 is configured to determine a matching degree between each of the at least one descriptive element and the judgment result using a preset verification model to obtain each actual matching value respectively; the verification model being obtained by training based on a term frequency-inverse document frequency TF-IDF relationship between the descriptive element and the judgment result. The first element and judgment accuracy determination unit 604 is configured to determine the descriptive element having the actual matching value exceeding a preset matching value as a first element, and determine accuracy of the judgment result based on a number of the first element.

In the present embodiment, in the apparatus 600 for verifying accuracy of a judgment result: for the specific processing and the technical effects of the user description information and judgment result acquisition unit 601, the descriptive element extraction unit 602, the matching degree verification unit 603 and the first element and judgment accuracy determination unit 604, reference may be made to the relevant descriptions of steps 201-204 in the corresponding embodiment of FIG. 2 respectively, and detailed description thereof will be omitted.

In some alternative implementations of the present embodiment, the apparatus 600 for verifying accuracy of a judgment result may further include the following unit.

A knowledge element determination unit is configured to determine a plurality of knowledge elements related to the judgment result using a preset knowledge graph.

A second element determination unit is configured to determine the descriptive element that is consistent with any of the knowledge elements as a second element; and the first element and judgment accuracy determination unit includes the following sub-unit.

A double element judgment result accuracy determination subunit is configured to determine the accuracy of the judgment result based on the number of the first element and the number of the second element.

In some alternative implementations of the present embodiment, the second element determination unit may be further configured to: acquire a confidence degree of each of the knowledge elements; calculate to obtain a similarity between each of the least one descriptive element and each of the knowledge elements respectively; and determine the knowledge element and the descriptive element that are consistent based on the similarity and the confidence degree, and determine the descriptive element that is consistent with any of the knowledge elements as the second element.

In some alternative implementations of the present embodiment, the double element judgment result accuracy determination subunit may be further configured to: deduplicate the first element and the second element to obtain an element set; and use a ratio of a number of elements in the element set to a total number of the knowledge elements as the accuracy of the judgment result.

In some alternative implementations of the present embodiment, the apparatus 600 for verifying accuracy of a judgment result may further include: a knowledge element supplementing unit, configured to add the first element different from any of the knowledge elements to the knowledge graph as a supplementary element, in response to the first element being different from any of the knowledge elements.

In some alternative implementations of the present embodiment, the double element judgment result accuracy determination subunit may be further configured to: acquire a first number weight and a second number weight set respectively for the first element and the second element in advance; calculate the number of the first element and the first number weight, the number of the second element and the second number weight according to a weighted calculation method to obtain a weighted element number; and determine the accuracy of the judgment result based on the weighted element number.

The present embodiment exists as the apparatus embodiment corresponding to the foregoing method embodiment. In order to determine whether the judgment result is accurate in the judgment of the user description information, the apparatus for verifying accuracy of a judgment result provided by embodiments of the present disclosure uses the pre-trained verification model representing the TF-IDF relationship between the descriptive element and the judgment result to verify whether the actual descriptive element extracted from the user description information matches the actual judgment result, to obtain the matching degree between each descriptive element and the judgment result, and finally reflect the accuracy of the judgment result by the number of matched descriptive element, thereby improving the credibility of the judgment result.

According to an embodiment of the present disclosure, the present disclosure further provides an electronic device and a computer readable storage medium.

Figure 9:
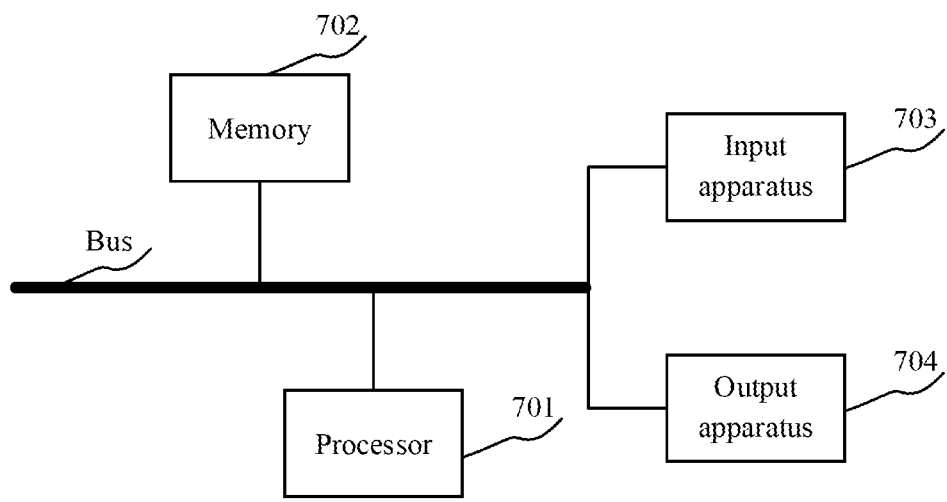
FIG. 9 is a schematic structural diagram of an electronic device for performing the method for verifying accuracy of a judgment result according to an embodiment of the present disclosure.

FIG. 9 shows a block diagram of an electronic device for implementing the method for verifying accuracy of a judgment result according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 9, the electronic device includes: one or more processors 701, a memory 702, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations, for example, as a server array, a set of blade servers, or a multi-processor system. In FIG. 9, one processor 701 is used as an example.

The memory 702 is a non-transitory computer readable storage medium provided by embodiments of the present disclosure. The memory stores instructions executable by at least one processor, so that the at least one processor performs the method for verifying accuracy of a judgment result provided by embodiments of the present disclosure. The non-transitory computer readable storage medium of embodiments of the present disclosure stores computer instructions for causing a computer to perform the method for verifying accuracy of a judgment result provided by embodiments of the present disclosure.

The memory 702, as a non-transitory computer readable storage medium, may be used to store non-transitory software programs, non-transitory computer executable programs and modules, such as program instructions/modules (for example, the user description information and judgment result acquisition unit 601, the descriptive element extraction unit 602, the matching degree verification unit 603 and the first element and judgment accuracy determination unit 604 as shown in FIG. 6) corresponding to the method for verifying accuracy of a judgment result in embodiments of the present disclosure. The processor 701 executes the non-transitory software programs, instructions, and modules stored in the memory 702 to execute various functional applications and data processing of the server, that is, to implement the method for verifying accuracy of a judgment result in the foregoing method embodiments.

The memory 702 may include a storage program area and a storage data area, where the storage program area may store an operating system and an application program required by at least one function; and the storage data area may store data created by the electronic device for performing the method for verifying accuracy of a judgment result. In addition, the memory 702 may include a high-speed random access memory, and may also include a non-transitory memory, such as at least one magnetic disk storage device, a flash memory device, or other non-transitory solid-state storage devices. In some embodiments, the memory 702 may optionally include memories remotely provided with respect to the processor 701, and these remote memories may be connected to the electronic device suitable for performing the method for verifying accuracy of a judgment result through a network. Examples of the above network include but are not limited to the Internet, intranet, local area network, mobile communication network, and combinations thereof.

The electronic device for performing the method for verifying accuracy of a judgment result may further include: an input apparatus 703 and an output apparatus 704. The processor 701, the memory 702, the input apparatus 703, and the output apparatus 704 may be connected through the bus or in other methods. In FIG. 9, connection through the bus is used as an example.

The input apparatus 703 may receive input digital or character information, and generate key signal inputs related to user settings and function control of the electronic device for performing the method for verifying accuracy of a judgment result, such as touch screen, keypad, mouse, trackpad, touchpad, pointing stick, one or more mouse buttons, trackball, joystick and other input apparatuses. The output apparatus 704 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and Internet.

The computer system may include a client and a server. The client and the server are generally remote from each other and typically interact through the communication network. The relationship between the client and the server is generated through computer programs running on the respective computers and having a client-server relationship to each other.

In order to determine whether the judgment result is accurate in the judgment of the user description information, embodiments of the present disclosure use the pre-trained verification model representing the TF-IDF relationship between the descriptive element and the judgment result to verify whether the actual descriptive element extracted from the user description information matches the actual judgment result, to obtain the matching degree between each descriptive element and the judgment result, and finally reflect the accuracy of the judgment result by the number of matched descriptive element, thereby improving the credibility of the judgment result.

It should be understood that the various forms of processes shown above may be used to resort, add or delete steps. For example, the steps described in embodiments of the present disclosure may be performed in parallel, sequentially, or in a different order. As long as the desired result of the technical solution disclosed in embodiments of the present disclosure can be achieved, no limitation is made herein.

Embodiments do not constitute a limitation to the scope of protection of the present disclosure. It should be appreciated by those skilled in the art that various modifications, combinations, sub-combinations and substitutions may be made depending on design requirements and other factors. Any modifications, equivalents and replacements, and improvements falling within the spirit and the principle of embodiments of the present disclosure should be included within the scope of protection of the present disclosure.

What is claimed is:

1. A method for verifying accuracy of a judgment result, implemented by a server, the method comprising:
    Acquiring, from a user terminal, user description information and a judgment result corresponding to the user description information, wherein the user description information comprises: a meeting log, content of a webpage article, or medical record information, and correspondingly the judgment result corresponding to the user description information comprises: whether the meeting log is written in a preset format, whether the content of the webpage article contains a sensitive word, or a suspected disease;
    extracting at least one descriptive element from the user description information;
    determining a matching degree between each of the at least one descriptive element and the judgment result using a preset verification model to obtain each actual matching value respectively; the verification model being obtained by training a neural network based on a term frequency-inverse document frequency TF-IDF relationship between the descriptive element and the judgment result;
    determining, in the at least one descriptive element, a descriptive element having the actual matching value exceeding a preset matching value as a first element;
    determining a plurality of knowledge elements related to the judgment result using a preset knowledge graph;
    determining, in the at least one descriptive element, a descriptive element that is consistent with any of the knowledge elements as a second element; and
    determining the accuracy of the judgment result based on the number of the first element and a number of the second element, highlighting the first element and the secodn element and displaying the highlighted first and second elements on the user terminal.

2. The method according to claim 1, wherein, the determining the descriptive element that is consistent with any of the knowledge elements as the second element, comprises:
    acquiring a confidence degree of each of the knowledge elements;
    calculating to obtain a similarity between each of the at least one descriptive element and each of the knowledge elements respectively; and
    determining the knowledge element and the descriptive element that are consistent based on the similarity and the confidence degree, and determining the descriptive element that is consistent with any of the knowledge elements as the second element.

3. The method according to claim 1, wherein, the determining the accuracy of the judgment result based on the number of the first element and the number of the second element, comprises:
    deduplicating the first element and the second element to obtain an element set; and
    using a ratio of a number of elements in the element set to a total number of the knowledge elements as the accuracy of the judgment result.

4. The method according to claim 1, further comprising:
    adding the first element different from any of the knowledge elements to the knowledge graph as a supplementary element, in response to the first element being different from any of the knowledge elements.

5. The method according to claim 1, wherein, the determining the accuracy of the judgment result based on the number of the first element and the number of the second element, comprises:
    acquiring a first number weight and a second number weight set respectively for the first element and the second element in advance;
    calculating the number of the first element and the first number weight, the number of the second element and the second number weight according to a weighted calculation method to obtain a weighted element number; and
    determining the accuracy of the judgment result based on the weighted element number.

6. An electronic device, comprising:
    at least one processor; and
    a memory communicatively connected with the at least one processor;
    the memory storing instructions executable by the at least one processor, and the instructions, when executed by the at least one processor, causing the at least one processor to perform operations, the operations comprising:
    acquiring, from a user terminal, user description information and a judgment result corresponding to the user description information, wherein the user description information comprises: a meeting log, content of a webpage article, or medical record information, and correspondingly the judgment result corresponding to the user description information comprises: whether the meeting log is written in a preset format, whether the content of the webpage article contains a sensitive word, or a suspected disease;
    extracting at least one descriptive element from the user description information;
    determining a matching degree between each of the at least one descriptive element and the judgment result using a preset verification model to obtain each actual matching value respectively; the verification model being obtained by training a neural network based on a term frequency-inverse document frequency TF-IDF relationship between the descriptive element and the judgment result;
    determining, in the at least one descriptive element, a descriptive element having the actual matching value exceeding a preset matching value as a first element;
    determining a plurality of knowledge elements related to the judgment result using a preset knowledge graph;
    determining, in the at least one descriptive element, a descriptive element that is consistent with any of the knowledge elements as a second element; and
    determining the accuracy of the judgment result based on the number of the first element and a number of the second element, highlighting the first element and the second element and displaying the highlighted first and second elements on the user terminal.

7. The electronic device according to claim 6, wherein, the determining the descriptive element that is consistent with any of the knowledge elements as the second element, comprises:
    acquiring a confidence degree of each of the knowledge elements;
    calculating to obtain a similarity between each of the at least one descriptive element and each of the knowledge elements respectively; and
    determining the knowledge element and the descriptive element that are consistent based on the similarity and the confidence degree, and determining the descriptive element that is consistent with any of the knowledge elements as the second element.

8. The electronic device according to claim 6, wherein, the determining the accuracy of the judgment result based on the number of the first element and the number of the second element, comprises:
    deduplicating the first element and the second element to obtain an element set; and
    using a ratio of a number of elements in the element set to a total number of the knowledge elements as the accuracy of the judgment result.

9. The electronic device according to claim 6, the operations further comprising:

adding the first element different from any of the knowledge elements to the knowledge graph as a supplementary element, in response to the first element being different from any of the knowledge elements.

10. The electronic device according to claim 6, wherein, the determining the accuracy of the judgment result based on the number of the first element and the number of the second element, comprises:
    acquiring a first number weight and a second number weight set respectively for the first element and the second element in advance;
    calculating the number of the first element and the first number weight, the number of the second element and the second number weight according to a weighted calculation method to obtain a weighted element number; and
    determining the accuracy of the judgment result based on the weighted element number.

11. A non-transitory computer readable storage medium storing computer instructions, the computer instructions, when executed by a computer, causing the computer to perform operations, the operations comprising:
    acquiring, from a user terminal, user description information and a judgment result corresponding to the user description information, wherein the user description information comprises: a meeting log, content of a webpage article, or medical record information, and correspondingly the judgment result corresponding to the user description information comprises: whether the meeting log is written in a preset format, whether the content of the webpage article contains a sensitive word, or a suspected disease;
    extracting at least one descriptive element from the user description information;
    determining a matching degree between each of the at least one descriptive element and the judgment result using a preset verification model to obtain each actual matching value respectively; the verification model being obtained by training a neural network based on a term frequency-inverse document frequency TF-IDF relationship between the descriptive element and the judgment result;
    determining, in the at least one descriptive element, a descriptive element having the actual matching value exceeding a preset matching value as a first element;
    determining a plurality of knowledge elements related to the judgment result using a preset knowledge graph;
    determining, in the at least one descriptive element, a descriptive element that is consistent with any of the knowledge elements as a second element; and
    determining the accuracy of the judgment result based on the number of the first element and a number of the second element, highlighting the first element and the second element and displaying the highlighted first and secodn elements on the user terminal.

12. The non-transitory computer readable storage medium according to claim 11, wherein, the determining the descriptive element that is consistent with any of the knowledge elements as the second element, comprises:
    acquiring a confidence degree of each of the knowledge elements;
    calculating to obtain a similarity between each of the at least one descriptive element and each of the knowledge elements respectively; and
    determining the knowledge element and the descriptive element that are consistent based on the similarity and the confidence degree, and determining the descriptive element that is consistent with any of the knowledge elements as the second element.

13. The non-transitory computer readable storage medium according to claim 11, wherein, the determining the accuracy of the judgment result based on the number of the first element and the number of the second element, comprises:
   deduplicating the first element and the second element to obtain an element set; and
   using a ratio of a number of elements in the element set to a total number of the knowledge elements as the accuracy of the judgment result.

14. The non-transitory computer readable storage medium according to claim 11, the operations further comprising:
   adding the first element different from any of the knowledge elements to the knowledge graph as a supplementary element, in response to the first element being different from any of the knowledge elements.

15. The non-transitory computer readable storage medium according to claim 11, wherein, the determining the accuracy of the judgment result based on the number of the first element and the number of the second element, comprises:
   acquiring a first number weight and a second number weight set respectively for the first element and the second element in advance;
   calculating the number of the first element and the first number weight, the number of the second element and the second number weight according to a weighted calculation method to obtain a weighted element number; and
   determining the accuracy of the judgment result based on the weighted element number.

* * * * *

UNITED STATES PATENT AND TRADEMARK OFFICE
CERTIFICATE OF CORRECTION

PATENT NO. : 12,159,235 B2
APPLICATION NO. : 17/208485
DATED : December 3, 2024
INVENTOR(S) : Zhihui Xing et al.

Page 1 of 1

It is certified that error appears in the above-identified patent and that said Letters Patent is hereby corrected as shown below:

In the Claims

Column 17, Claim 1, Line 58:
"Acquiring," should read: --acquiring,--.

Column 18, Claim 1, Line 23:
"secodn element" should read: --second element--.

Column 20, Claim 11, Line 55:
"secodn element" should read: --second element--.

Signed and Sealed this
Eighteenth Day of February, 2025

Coke Morgan Stewart
*Acting Director of the United States Patent and Trademark Office*